US00RE38765E

(19) United States
(12) Reissued Patent
Currey

(10) Patent Number: US RE38,765 E
(45) Date of Reissued Patent: Aug. 2, 2005

(54) COMBINATION SCREEN/CONVEYOR DEVICE REMOVABLY ATTACHABLE TO A VEHICLE

(76) Inventor: Albert Ben Currey, 46631 N. 11th Ave., Phoenix, AZ (US) 85087-7129

(21) Appl. No.: 09/873,026

(22) Filed: Jun. 1, 2001

Related U.S. Patent Documents

Reissue of:
(64) Patent No.: 6,138,837
Issued: Oct. 31, 2000
Appl. No.: 09/070,966
Filed: May 1, 1998

(51) Int. Cl.[7] ..... B07B 1/49; B07B 1/34; E02F 5/22; B66C 23/76

(52) U.S. Cl. ..... 209/421; 209/418; 209/419; 209/420; 209/325; 209/248; 209/257; 37/142.5; 37/410; 212/197

(58) Field of Search ..... 209/257, 248, 209/418, 419, 420, 421; 37/403, 410

(56) References Cited

U.S. PATENT DOCUMENTS

| | | | | | |
|---|---|---|---|---|---|
| 1,287,648 | A | * | 12/1918 | Currie | 171/92 |
| 2,142,794 | A | * | 1/1939 | Matthews | 171/132 |
| 2,857,691 | A | * | 10/1958 | Curran | 172/33 |
| 3,003,265 | A | * | 10/1961 | Lutjens | 37/444 |
| 3,106,793 | A | * | 10/1963 | Savage | 171/136 |
| 3,596,384 | A | * | 8/1971 | Neujahr | 37/142.5 |
| 3,701,422 | A | * | 10/1972 | Downey | 209/241 |
| 4,301,910 | A | * | 11/1981 | Price | 198/304 |
| 4,633,604 | A | * | 1/1987 | Adamson et al. | 38/2 |
| 4,664,791 | A | * | 5/1987 | McClain et al. | 209/421 |
| 4,948,299 | A | * | 8/1990 | Cronk et al. | 405/179 |
| 5,081,991 | A | * | 1/1992 | Chance | 600/411 |
| 5,084,991 | A | * | 2/1992 | Cronk, Jr. | 37/142.5 |
| 5,120,433 | A | * | 6/1992 | Osadchuk | 209/235 |
| 5,197,211 | A | * | 3/1993 | Haug | 37/305 |
| 5,479,726 | A | * | 1/1996 | Bishop | 37/142.5 |
| 5,493,796 | A | * | 2/1996 | Ballew et al. | 37/142.5 |
| 5,581,916 | A | * | 12/1996 | Hirose et al. | 37/444 |
| 5,596,824 | A | * | 1/1997 | Scott et al. | 37/403 |
| 5,598,935 | A | * | 2/1997 | Harrison et al. | 212/197 |
| 5,788,168 | A | * | 8/1998 | Gilbert et al. | 241/101.742 |
| 5,938,373 | A | * | 8/1999 | Scudder | 405/179 |
| 6,125,558 | A | * | 10/2000 | Stewart | 37/142.5 |
| 6,158,925 | A | * | 12/2000 | Schleining et al. | 405/179 |
| 6,382,425 | B1 | * | 5/2002 | Brickner et al. | 209/421 |
| 2002/0124441 | A1 | * | 9/2002 | Mallaghan | 37/403 |

FOREIGN PATENT DOCUMENTS

| | | | | |
|---|---|---|---|---|
| GB | 689917 | * | 4/1953 | 209/421 |

* cited by examiner

*Primary Examiner*—Donald P. Walsh
*Assistant Examiner*—Daniel K Schlak
(74) *Attorney, Agent, or Firm*—Schmeiser Olsen & Watts, LLP

(57) ABSTRACT

In combination a screen, a shaker, a conveyor and carbody device which is attachable to a vehicle of choice, such as an hydraulic excavator, a backhoe, etc., and when installed thereon allows the vehicle to perform as a padding machine.

44 Claims, 4 Drawing Sheets

COMBINATION SCREEN/CONVEYOR DEVICE REMOVABLY ATTACHABLE TO A VEHICLE

Matter enclosed in heavy brackets [ ] appears in the original patent but forms no part of this reissue specification; matter printed in italics indicates the additions made by reissue.

FIELD OF THE INVENTION

Disclosed herein we provide in combination a shaker, a screen and conveyor which are fixedly attached to a device. With the device having attachment means for attaching the device to a vehicle of choice, such as a hydraulic excavator, or the like, thus providing an apparatus for converting a vehicle into substantially a padding machine.

BACKGROUND OF THE INVENTION

It is well known in the field that underground cables and pipelines are typically placed by laying the cable or pipeline in a prepared trench and subsequently back-filling the trench. Unfortunately, some cables and pipelines are susceptible to damage from stones or other hard objects in the backfill material. For example, optical fiber communications cables are considered particularly susceptible to damage in this manner, as are polymeric or plastic pipelines. Also, steel pipes are increasingly provided with protective polymeric coatings, which must be protected from penetration or damage by hard objects.

Consequently, in the laying of cables and pipelines, it is increasingly sought to back-fill the trench with fill material that is free of stones or other hard objects. One way to achieve this is to backfill the trench with sand or other suitable fill Material brought from a remote source of sand or rock-free soil. This approach is however relatively expensive and time consuming. Further, where steel pipe is covered with a layer of sand, the filled trench tends to collect sanding water in the porous sand fill, leading to premature corrosion of the pipe. Also, the use of a fill material that is different from the surrounding soil results in a loss of cathodic protection, which also leads to premature corrosion of steel pipe. The alternative is to screen the soil dug from the trench, remove stones and other foreign objects, and return the screened soil to the trench. Several machines, known as padding machines, have been disclosed within the prior art for this purpose.

For example, U.S. Pat. No. 2,857,691 To Curran discloses a tracked vehicle having a vertically swingable boom that extends laterally over a trench. The boom includes a tube having an enclosed auger. At the far end of the boom from the vehicle is a rotating head which scoops up soil from alongside the trench, screens the soil, and transmits it to the auger, which conveys the screened soil along the tube and into the trench through openings in the tube. The Curran apparatus is particularly designed for use with a vehicle that is driven along the opposite side of a trench from the pile of soil that was removed from the trench and which extends alongside the trench.

U.S. Pat. No. 4,633,602, to Layh, et al., teaches the use of a gathering belt that dumps material onto a separator screen, allowing fines to fall onto a lateral belt. This device does not provide for screening during the initial conveying nor is the device removably attachable to a vehicle, such as a hydraulic excavator, backhoe, or the like, as is the present invention.

Other examples are disclosed in U.S. Pat. Nos.: 3,596,384, 4,301,910 and 4,664,791. All of which are much too complicated and include many disadvantages which the present invention addresses and overcomes in a manner heretofore not seen nor taught within the prior art.

It is to be noted the padding machines that are currently available today are extremely large, and they are only primarily used for long-distance pipe laying operations in open country, where rights of way are wide and there is little or no rugged terrain. Such machines have limited usefulness where rights of way are narrow, where trenches do not follow a straight path, or where the terrain is relatively rugged.

SUMMARY OF THE INVENTION

Accordingly, it is an object and purpose of the present invention to provide in combination a screen, a shaker and conveyor which are fixedly attached to a device, with the device being attachable to a hydraulic excavator, backhoe, or the like.

It is another object of the present invention to provide an attachment device which substantially converts a typical hydraulic excavator, backhoe, or the like, into substantially a padding machine.

It is still another object of the present invention to provide a device which when attached to a vehicle, such as a hydraulic excavator or backhoe, allows an operator to easily screen and convey backfill material into a trench, even when the vehicle encounters rough terrain, or when the trench is not in a straight path, or where the right of way is narrow. Unlike the current padding machines which are much too large and not at all suitable in such conditions.

Yet another object of the present invention is to provide in combination a shaker, screen and conveyor which are fixedly attached to a device, with the device being attachable to substantially any vehicle of choice, such as a hydraulic excavator, tractor, backhoe, etc., and the screen and conveyor are operable to continuously lift and screen soil from a piled ridge extending alongside a trench, and to convey the screened soil into the trench, while collecting or discarding stones and other large objects in the soil.

Yet another object of the present invention is to provide in combination a shaker, a screen and conveyor which are actuated by hydraulic power from the auxiliary power output typically found on conventional loaders or other vehicles, such as hydraulic excavators, backhoes, bulldozers, trucks, or the like.

Other objects, advantages and novel features will be set forth in part in the detailed description to follow, when taken into consideration with the accompanying drawings, and in part will become apparent to those skilled in the art upon examination of the following, or may be learned by practice of the invention.

DETAILED DESCRIPTION OF THE DRAWINGS

Referring now in detail to the drawings wherein like characters refer to like elements throughout the various views.

Figure 1:
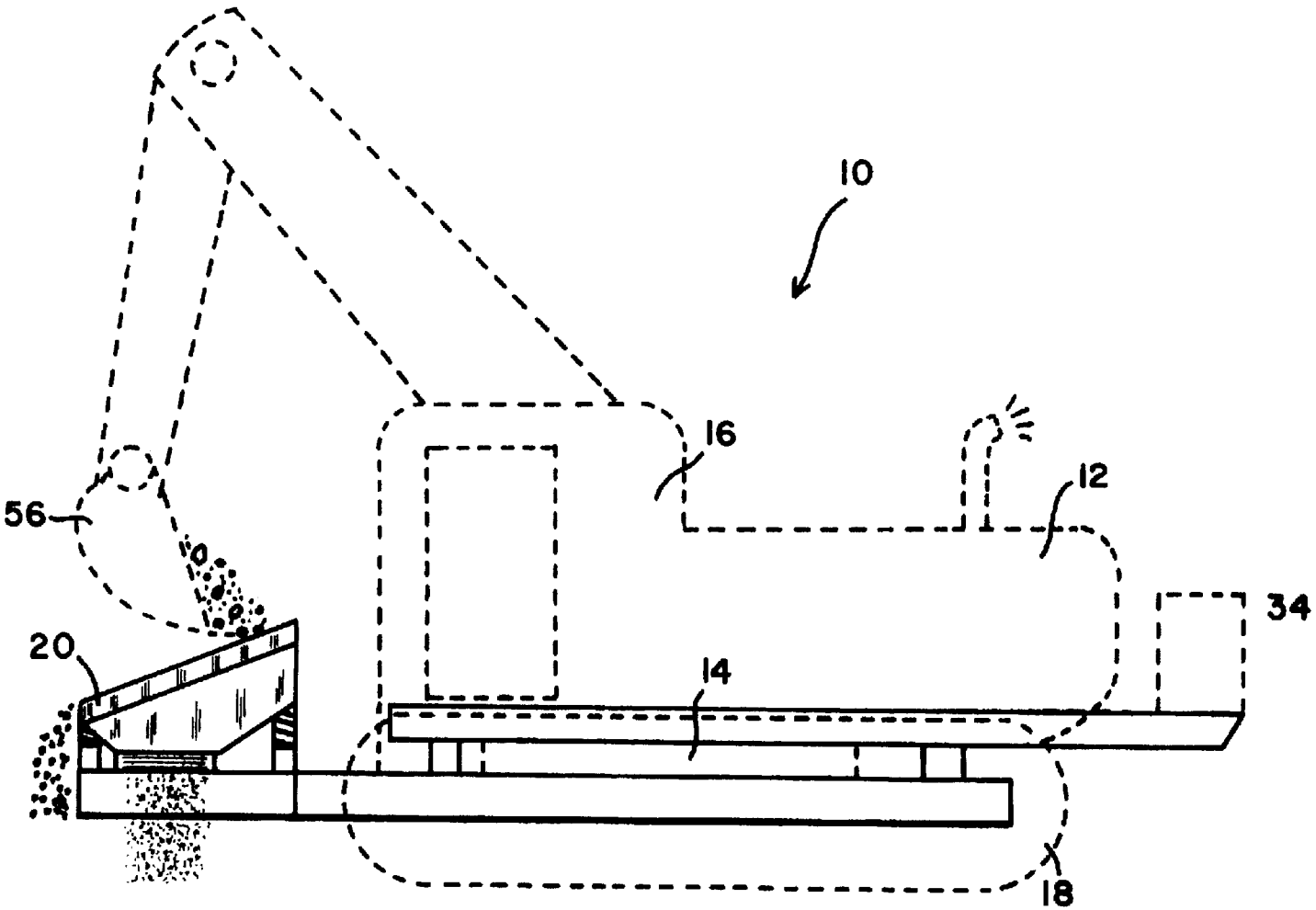
FIG. 1 is substantially a plan view for the present invention.
Figure 2:
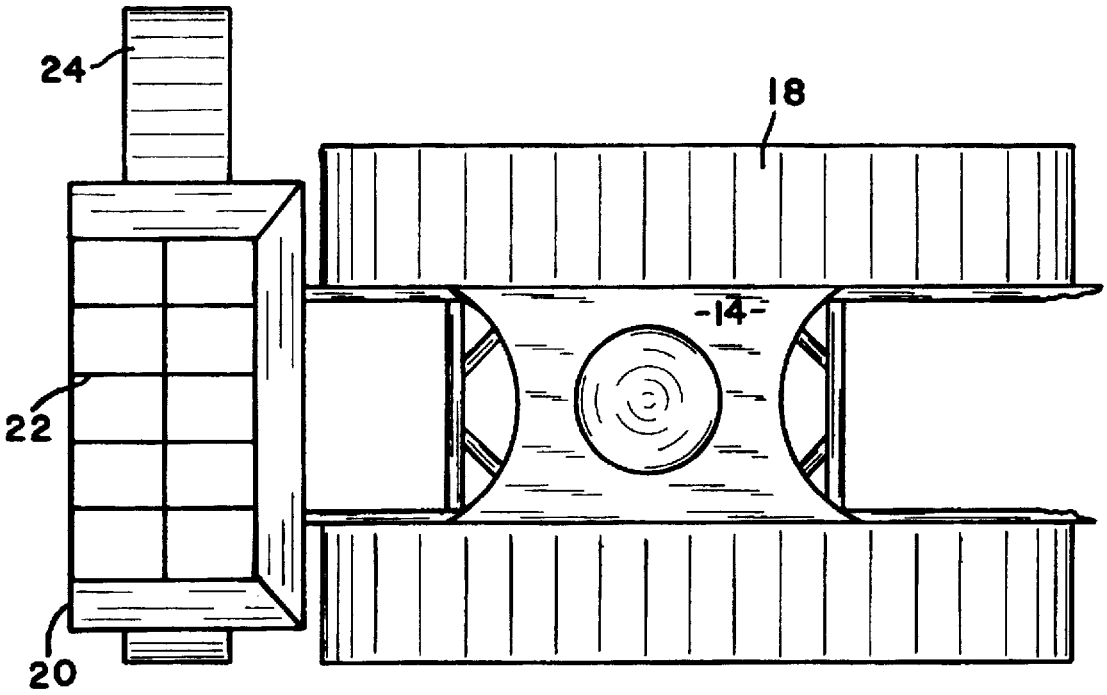
FIG. 2 is substantially a partial top view of the present invention.
Figure 3:
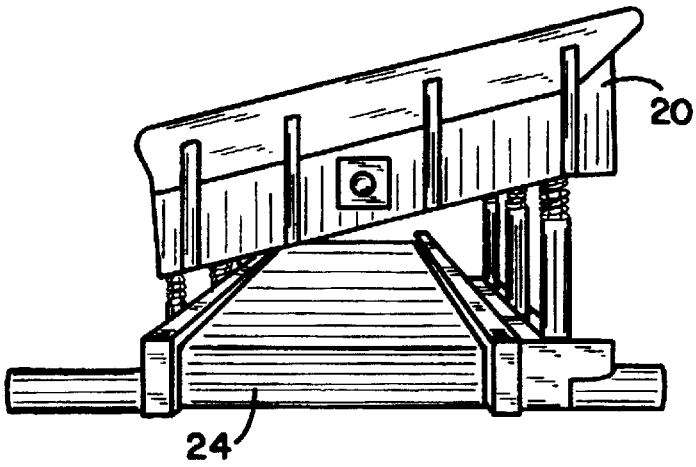
FIG. 3 is substantially an end view of a shaker, screen and conveyor.

As shown in FIG. 1, (arrow 10) represents an overview of the present invention, which is substantially an apparatus for converting a vehicle of choice into a padding machine. Therein we show a typical prior art hydraulic excavator (12) that includes a mounting structure typically known in the field as a carbody (14). Such as produced by Caterpiller part #325B, and carbody (14) substantially pivotably attaches the vehicle body (16) to substantially the vehicle base (not shown) which includes typical vehicle tracks (18).

Figure 4:
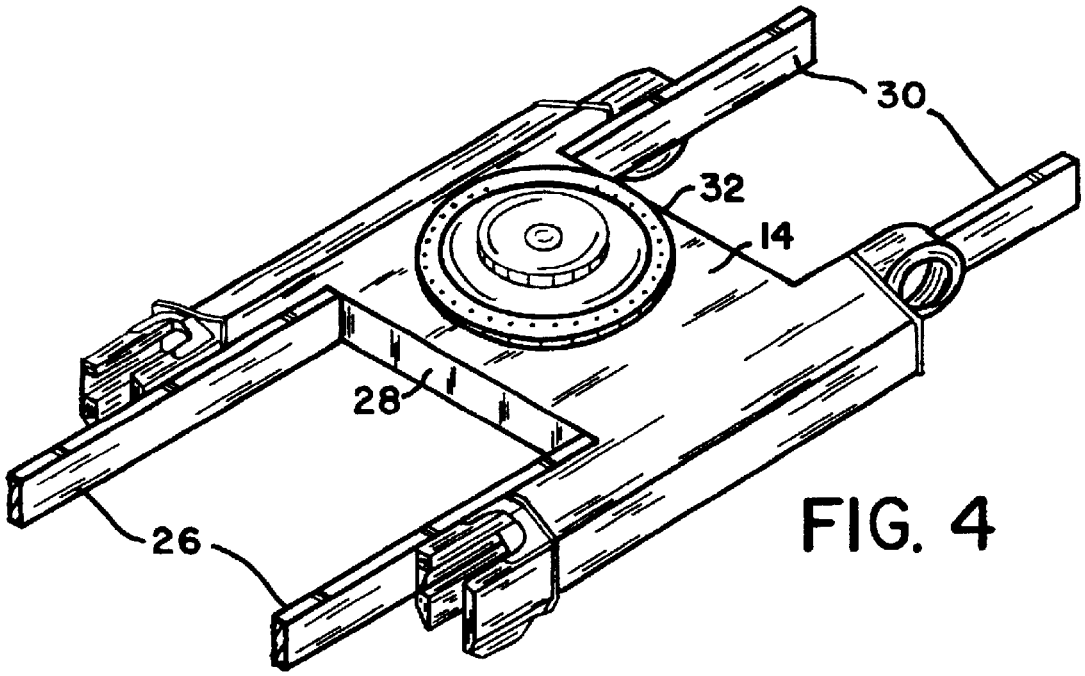
FIG. 4 is substantially a perspective view of one embodiment for the present vehicle attachment device.

The present invention substantially addresses and discloses a unique type of apparatus that includes in combination a carbody (14), a shaker (20), a screen (22) and a conveyor (24). With the carbody (14) being attachable to vehicle (12), such as by any suitable attachment means as typically taught within the prior art, and carbody (14) being fixedly attached to shaker (20), and screen (22) being fixedly attached within shaker (20), and conveyor (24) being fixedly attached to shaker (20). It is to be noted the attachment means for attaching screen (22) within shaker (20) and for attaching conveyor (24) to shaker (20) can be any suitable attachment means of engineering choice, as each are well known within the art. Thus, the applicants do not attempt to teach such attachment means herein. Referring now to FIG. 4, wherein we show one embodiment for carbody (14) that substantially exemplifies attachment means for fixedly attaching carbody (14) to shaker (20). As illustrated, the attachment means includes a first pair of elongated members (26) which are fixedly attached by any suitable attachment means, such as by welding (not shown), to substantially a first side (28) of carbody (14), first pair of members (26) being substantially spaced apart and horizontally aligned with each other. Although not shown, it is to be noted that first pair of members (26) are of any suitable length of engineering choice, and are fixedly attached to shaker (20) at any suitable location of engineering choice.

Further shown in FIG. 4, is a second pair of elongated members (30) which are fixedly attached by any suitable attachment means of engineering choice to substantially a second side (32) of carbody (14). It is to be noted second pair of members (30) are of any suitable length of engineering choice, which allows the power supply with motor (34) of vehicle (12), to be supported in a secure manner thereon.

Figure 5:
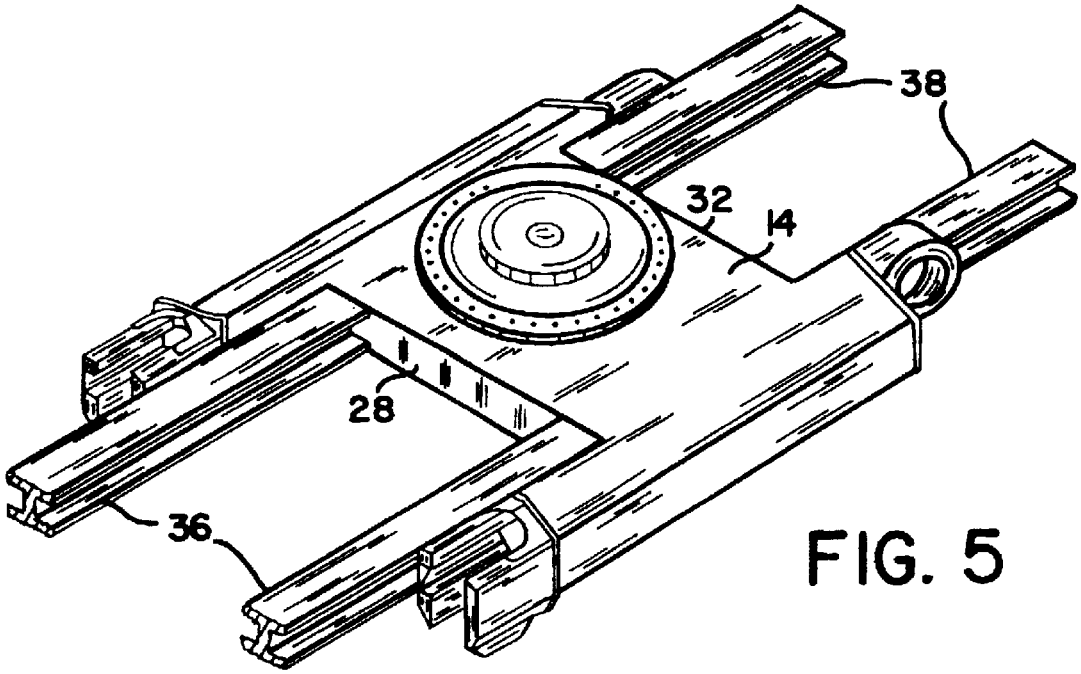
FIG. 5 is substantially a perspective view of a second embodiment for the present vehicle attachment device.

Referring now to FIG. 5, wherein we show a second embodiment for carbody (14) that substantially exemplifies attachment means for fixedly attaching carbody (14) to shaker (20). As illustrated, the attachment means includes a first pair of I-beams (36) which are fixedly attached by any suitable attachment means, such as by welding (not shown), to substantially first side (28) of carbody (14). First pair of I-beams (36) being substantially spaced apart and horizontally aligned with each other. Although not shown, it is to be noted that first pair of I-beams (36) are of any suitable length of engineering choice, and are fixedly attached to shaker (20) at any suitable location of engineering choice.

Further shown in FIG. 5, is a second pair of I-beams (38) which are fixedly attached by any suitable attachment means of engineering choice to substantially second side (32) of carbody (14). It is to be noted second pair of I-beams (38) are of any suitable length of engineering choice, which allows the power supply with motor (34) of vehicle (12), to be supported in a secure manner thereon.

Figure 6:
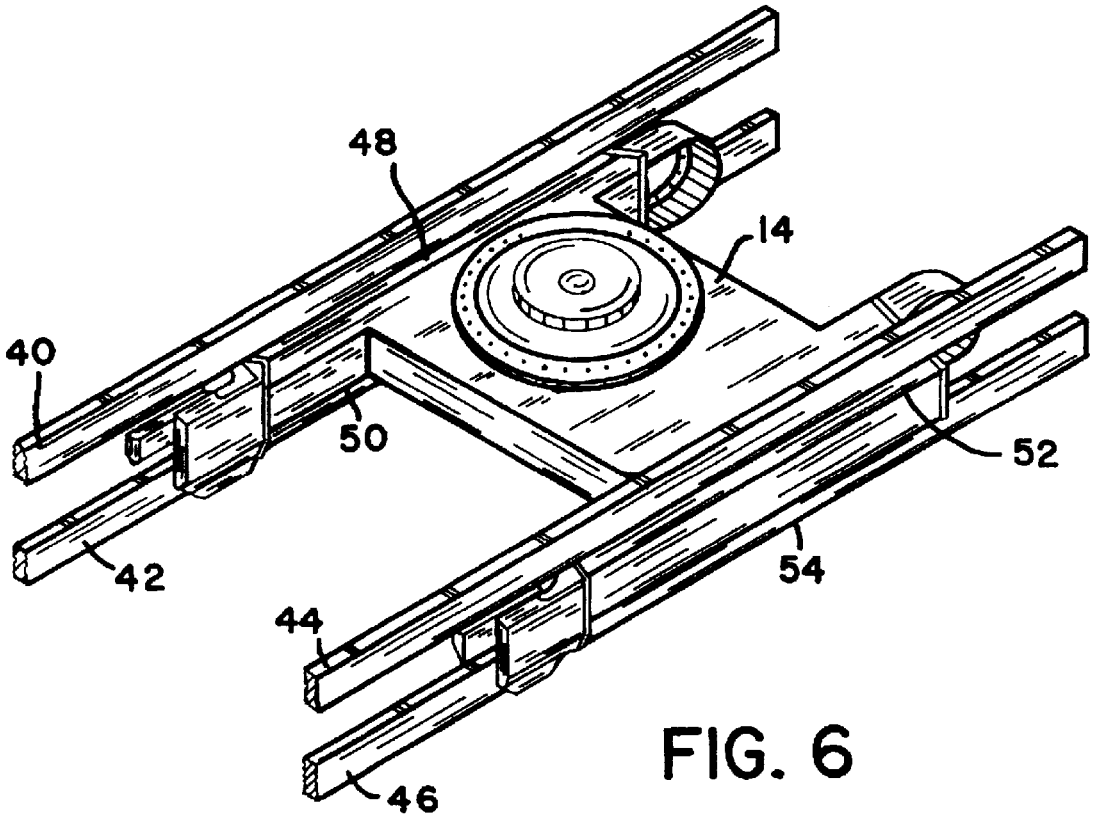
FIG. 6 is substantially a perspective view of a third embodiment for the present vehicle attachment device.

Referring now to FIG. 6, wherein we show a third embodiment for carbody (14) that substantially exemplifies attachment means for fixedly attaching carbody (14) to shaker (20). As illustrated therein, the attachment means includes a first elongated member (40), a second elongated member (42), a third elongated member (44), and a fourth elongated member (46). First member (40) being positioned substantially on a first top exposed surface (48) on carbody (14) and second member (42) being positioned substantially on a first bottom exposed surface (50) on carbody (14). With first top surface (48) and first bottom surface (50) being substantially spaced apart and opposed to each other, and first member (40) and second member (42) being substantially spaced apart, with first member (40) being substantially aligned with second member (42). Although not shown, it is to be noted that first member (40) and second member (42) are fixedly attached together by any suitable attachment means of engineering choice, such as by prior art U-bolts, or the like. As further illustrated within FIG. 6, third member (44) is positioned substantially on a second top exposed surface (52) on carbody (14) and fourth member (46) is positioned substantially on a second bottom exposed surface (54) on carbody (14). With second top surface (52) and second bottom surface (54) being substantially spaced apart and opposed to each other and third member (44) and fourth member (46) being substantially spaced apart, with third member (44) being substantially aligned with fourth member (46). Although not shown, it is to be noted that third member (44) and fourth member (46) are fixedly attached together by any suitable attachment means of engineering choice, such as by prior art U-bolts, or the like.

It is to be noted that carbody (14) can be manufactured in various forms if so desired, or it can be a typical prior art carbody, such as found on hydraulic excavators.

However, the present apparatus may be attached to substantially any type of vehicle of choice, such as a conventional hydraulic excavator, backhoe, etc., and when the present carbody (14) is installed upon the vehicle the vehicle may then be used as a typical padding machine.

It will now be seen that we have herein disclosed in combination a shaker (20), a screen (22), a conveyor (24) and a carbody (14) which when installed on a typical vehicle, such as a hydraulic excavator, allows the vehicle to perform as a padding machine. For example, when the hydraulic excavator is positioned substantially next to a ditch, the operator may then pick up excavated material with the bucket (56), and then pour the material into screen (22), which in turn separates larger material from smaller material by shaking. Thereafter, the smaller material is directed onto the conveyor (24) where it is then carried and directed into the trench, and thus the screened material provides padding for the pipeline or cable.

It will now be seen that we have herein provided a shaker, screen and conveyor in combination, which are fixedly attached to a carbody, with the carbody being attachable to a hydraulic excavator, backhoe, etc.

It will further be seen that we have herein provided a carbody that substantially converts a typical hydraulic excavator or backhoe into substantially a padding machine.

It will also be seen, we have herein provided a carbody which when removably attached to a vehicle, such as a hydraulic excavator, allows an operator to easily screen and convey backfill material into a trench, even when the vehicle encounters rough terrain, even when the trench is not in a straight path, or even when the right of way is narrow. Therefore the present invention is very unlike the prior art padding machines which are much to large, and not at all suitable in such conditions.

It will also be seen that we have herein provided in combination a shaker, screen and conveyor which are fixedly attached to a carbody, with the carbody being attachable to substantially any vehicle of choice, such as a hydraulic excavator, backhoe, etc., and the screen and conveyor are operable to continuously lift and screen soil from a piled ridge extending alongside a trench, and to convey the screened soil into the trench, while collecting or discarding stones and other large objects in the soil.

It will further be seen that we have herein provided in combination a screen and conveyor which are electrically connected to, and actuated by hydraulic power from the auxiliary power output, as typically found on conventional hydraulic excavators or other vehicles, such as backhoes, bulldozers, trucks, and the like.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

What we claim as new as wish to secure by Letters Patent is:

1. A padding machine comprising:

a frame;

a shaker attached to the frame;

a screen attached to the shaker;

a conveyor attached to the shaker;

a vehicle mounted on the frame; and a bucket attached to the vehicle;

wherein the bucket is adapted to pick up material and pour the material from the bucket and onto the screen;

wherein the shaker is adapted to shake the screen, thereby separating larger material from smaller material and allowing smaller material to pass through the screen; and wherein the screen communicates with the shaker such that material passing through the screen is directed to the conveyor.

2. The padding machine of claim 1, wherein the vehicle is pivotally mounted on the frame.

3. The padding machine of claim 1, wherein the vehicle is a hydraulic excavator.

4. The padding machine of claim 1, wherein the shaker is attached to the frame by a pair of elongate members extending from the shaker to the frame.

5. The padding machine of claim 1, wherein the conveyor is below the screen.

6. The padding machine of claim 1, wherein the conveyor comprises a conveyor belt.

7. The padding machine of claim 1, wherein the shaker, the conveyor, and the bucket are powered by the power supply of the vehicle.

8. The padding machine of claim 1, wherein the bucket is movable independent of the screen, the shaker, and the conveyor.

9. A padding machine comprising:

a frame;

a shaker attached to the frame;

a screen attached to the shaker;

a conveyor attached to the shaker;

a hydraulic excavator pivotally mounted on the frame; and a bucket attached to the excavator, the bucket being movable independent of the shaker, the screen, and the conveyor;

wherein the bucket is adapted to pick up material and pour the material from the bucket and onto the screen;

wherein the shaker is adapted to shake the screen, thereby separating larger material from smaller material and allowing smaller material to pass through the screen;

wherein the screen communicates with the shaker such that material passing through the screen is directed to the conveyor; and wherein the shaker, the conveyor, and the bucket are powered by the power supply of the excavator.

10. The padding machine of claim 9, wherein the shaker is attached to the frame by a pair of elongate members extending from the shaker to the frame.

11. The padding machine of claim 10, wherein the conveyor is below the screen.

12. The padding machine of claim 11, wherein the conveyor comprises a conveyor belt.

13. A method of padding a trench comprising:

picking up excavated material with a bucket that is attached to a vehicle;

pouring the excavated material from the bucket onto a screen, the screen being attached to a frame that supports the vehicle;

shaking the screen and thereby separating larger excavated material from smaller excavated material;

directing the smaller excavated material onto a conveyor that is attached to the frame; and conveying the excavated material to the trench.

14. The method of claim 13, wherein the method further comprises the step of moving the bucket to a position above the screen after the step of picking up the excavated material.

15. The method of claim 14, wherein the step of moving the bucket comprises pivoting the vehicle.

16. The method of claim 13, wherein the steps of picking up, pouring, shaking, and directing are all performed by power supplied from the vehicle.

*17. A padding machine comprising:*

*a frame;*

*a screen attached to the frame;*

*a conveyor attached to the frame;*

*a vehicle mounted on the frame; and*

*a bucket attached to the vehicle;*

*wherein the bucket is adapted to pick up material and pour the material from the bucket onto the screen while the vehicle is mounted on the frame;*

*wherein the screen is adapted to separate larger material from smaller material and allow smaller material to pass through the screen; and*

*wherein the screen communicates with the conveyor such that the material passing through the screen is directed to the conveyor.*

*18. The padding machine of claim 17, wherein the vehicle is pivotally mounted on the frame.*

*19. The padding machine as in claim 17 wherein the vehicle is one of an excavator, a tractor, a backhoe, a bulldozer, a conventional loader and a truck.*

*20. A padding machine comprising:*

*a frame attached to a vehicle;*

*a separating mechanism attached to the frame; and,*

*a conveyor attached to the frame;*

*wherein the vehicle has a bucket structured and arranged to pick up material and deposit the material into the separating mechanism while the frame is attached to the vehicle;*

*wherein the separating mechanism is structured and arranged to separate larger material from smaller material and allow smaller material to pass from the separating mechanism onto the conveyor.*

*21. The padding machine as in claim 20 wherein the conveyor is structured and arranged to convey the smaller material for deposition in a trench.*

*22. The padding machine as in claim 20 wherein the vehicle is one of an excavator, a tractor, a backhoe, a bulldozer, a conventional loader and a truck.*

*23. The padding machine as in claim 20 wherein the separating mechanism comprises a shaker.*

*24. The padding machine as in claim 20 wherein the separating mechanism comprises a screen.*

*25. The padding machine as in claim 20 wherein the separating mechanism comprises an agitator.*

*26. The padding machine as in claim 20 wherein the padding machine is actuated by hydraulic power from an auxiliary power output of the vehicle.*

*27. The padding machine as in claim 20 wherein the frame is pivotally attached to the vehicle.*

*28. The padding machine as in claim 20 wherein the apparatus is structured and arranged to continuously lift and screen material and convey the screened material into a trench.*

*29. The padding machine as in claim 20 wherein the smaller material passes through the separating mechanism onto the conveyor.*

*30. A padding machine comprising:*

*a frame;*

*a vehicle attached to the frame;*

*a separating mechanism to separate larger material from smaller material attached to the frame;*

*a conveyor attached to the frame;*

*wherein the vehicle has a bucket structured and arranged to pick up material and deposit the material into the separating mechanism while the vehicle is attached to the frame;*

*wherein smaller material passing through the separating mechanism falls onto the conveyor.*

*31. The padding machine as in claim 30 wherein the conveyor is structured and arranged to convey the smaller material for deposition in a trench.*

*32. The padding machine as in claim 30 wherein the vehcile is one of an excavator, a tractor, a backhoe, a bulldozer, a conventional loader and a truck.*

*33. The padding machine as in claim 30 wherein the separating mechanism comprises a shaker.*

*34. The padding machine as in claim 30 wherein the separating mechanism comprises a screen.*

*35. The padding machine as in claim 30 wherein the separating mechanism comprises an agitator.*

*36. The padding machine as in claim 30 wherein the apparatus is actuated by hydraulic power from the auxiliary power output of the vehicle.*

*37. The padding machine as in claim 30 wherein the frame is pivotally attached to the vehicle.*

*38. A method of padding a trench comprising:*

*picking up excavated material with a bucket that is attached to a vehicle;*

*pouring the excavated material from the bucket to a separating mechanism that is attached to a frame that supports the vehicle;*

*separating larger excavated material from smaller excavated material;*

*directing the smaller excavated material to a conveyor that is attached to the frame; and*

*conveying the smaller excavated material to the trench.*

*39. The method of claim 38 further comprising discarding larger excavated material.*

*40. The method of claim 38 further comprising shaking at least one of the larger and the smaller excavated material.*

*41. The method of claim 38 further comprising shaking the separating mechanism.*

*42. The method of claim 38 further comprising agitating at least one of the larger and the smaller excavated material.*

*43. The method of claim 38 further comprising agitating the separating mechanism.*

*44. The method of claim 38 further comprising using hydraulic power from an auxiliary power output of the vehicle.*

* * * * *